Figure 1:
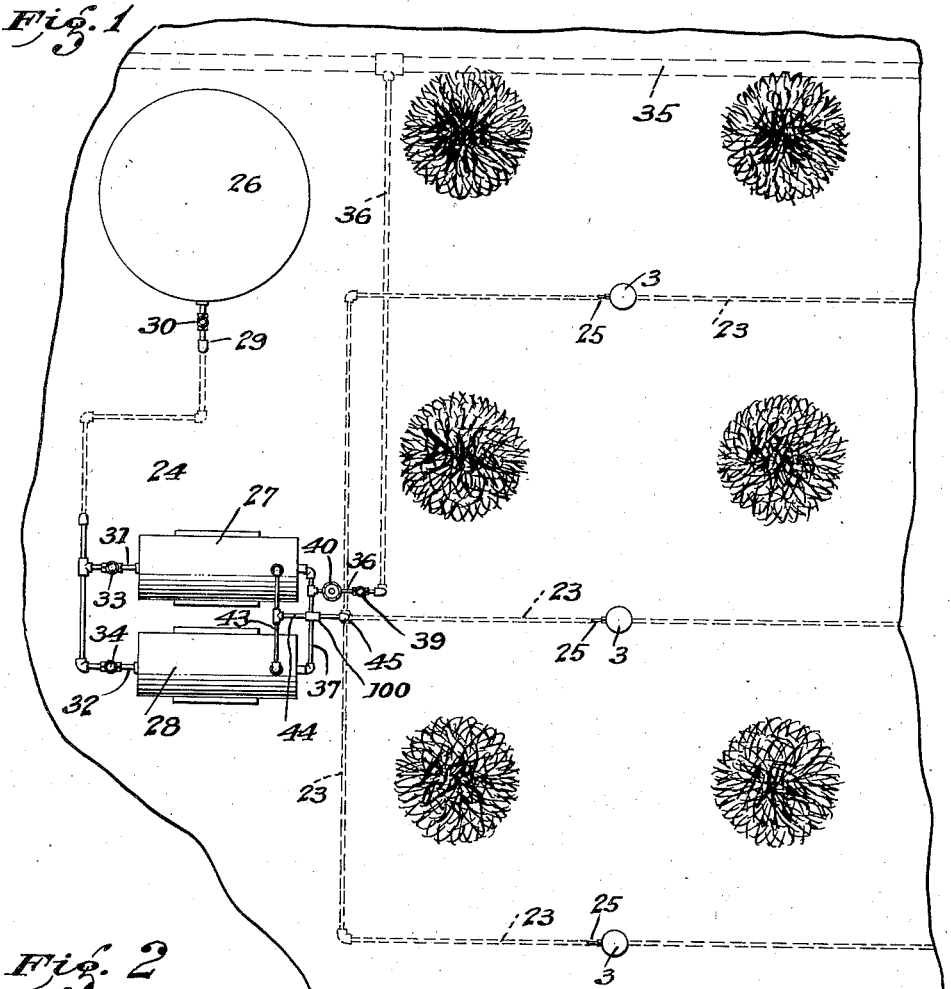

Oct. 1, 1935.  C. A. FUGIT  2,016,002
ORCHARD HEATER
Filed July 24, 1933  2 Sheets-Sheet 1

INVENTOR,
Carl A. Fugit;
BY
Calvin Brown
ATTORNEY

Oct. 1, 1935. C. A. FUGIT 2,016,002
ORCHARD HEATER
Filed July 24, 1933 2 Sheets-Sheet 2

INVENTOR.
Carl A. Fugit;
BY
Calvin Brown
ATTORNEY

Patented Oct. 1, 1935

2,016,002

UNITED STATES PATENT OFFICE 2,016,002

ORCHARD HEATER

Carl A. Fugit, Alhambra, Calif.

Application July 24, 1933, Serial No. 681,933

6 Claims. (Cl. 126—59.5)

This invention relates to heaters and more particularly to orchard heaters.

The use of smudge pots for heating orchards, such as the citrus tree orchards of Southern California, to prevent freezing of the trees and their fruit, is expensive, inefficient and causes considerable damage to the trees, fruit and buildings within the locality, by depositing soot thereupon. In Southern California, various ordinances have been passed prohibiting the use of smudge pots and heaters which deposit more than a specified minimum of soot.

The general object of the invention is to provide a smokeless and sootless orchard heater which will eliminate smudging up of orchard trees and their fruit and homes and other buildings and property in the locality of the heated orchard.

Another object is to provide an orchard heater of the character stated, which is simple in construction, highly efficient, economical, easy to operate and ready at all times for use to protect the trees and fruit of an orchard from frost and freezing.

Other objects and advantages will appear hereinafter.

With the above mentioned and other objects in view, the invention consists in the novel and useful provision, formation, construction, association, and relative arrangement of parts, members and features, all as shown in a certain embodiment in the accompanying drawings, described generally, and more particularly pointed out in the claims.

Figure 2:
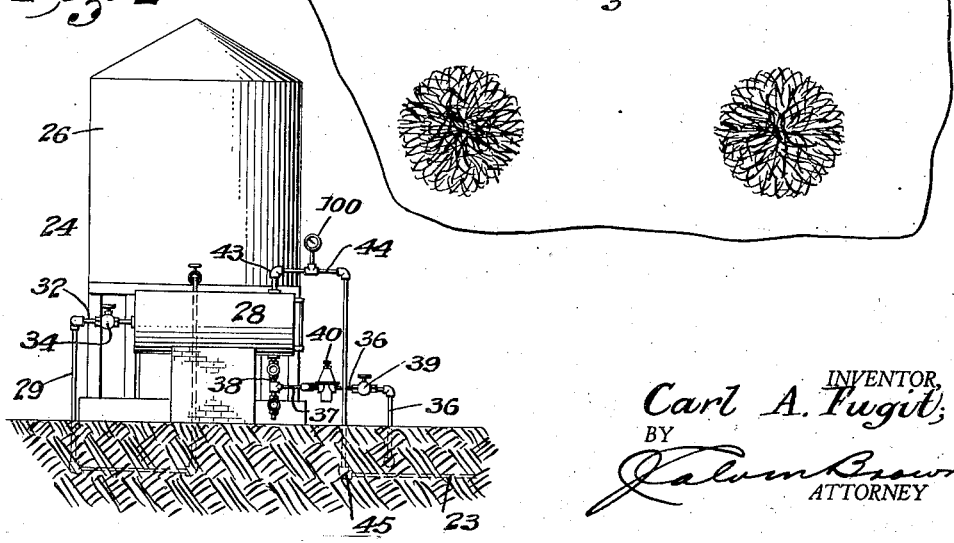
Figure 3:
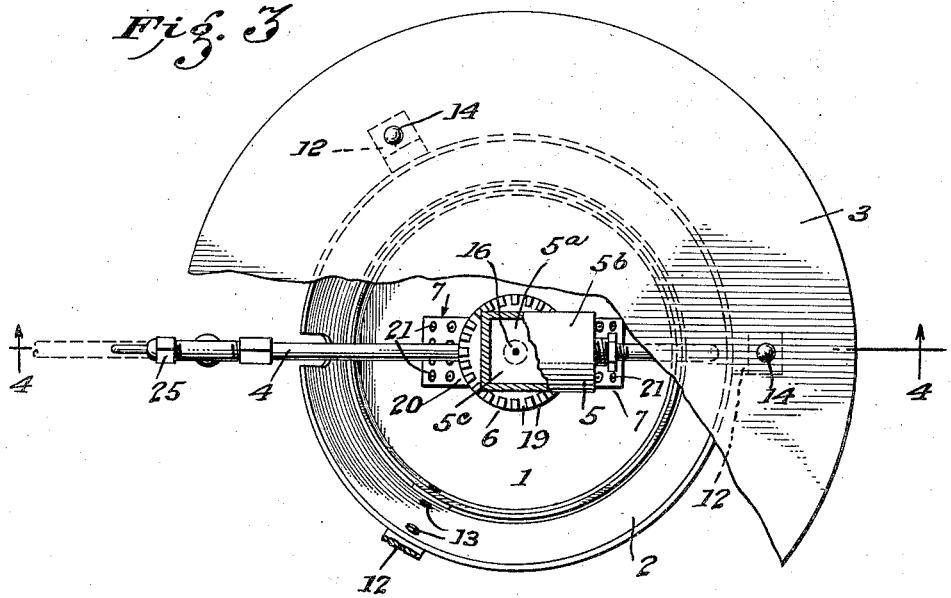
Figure 4:
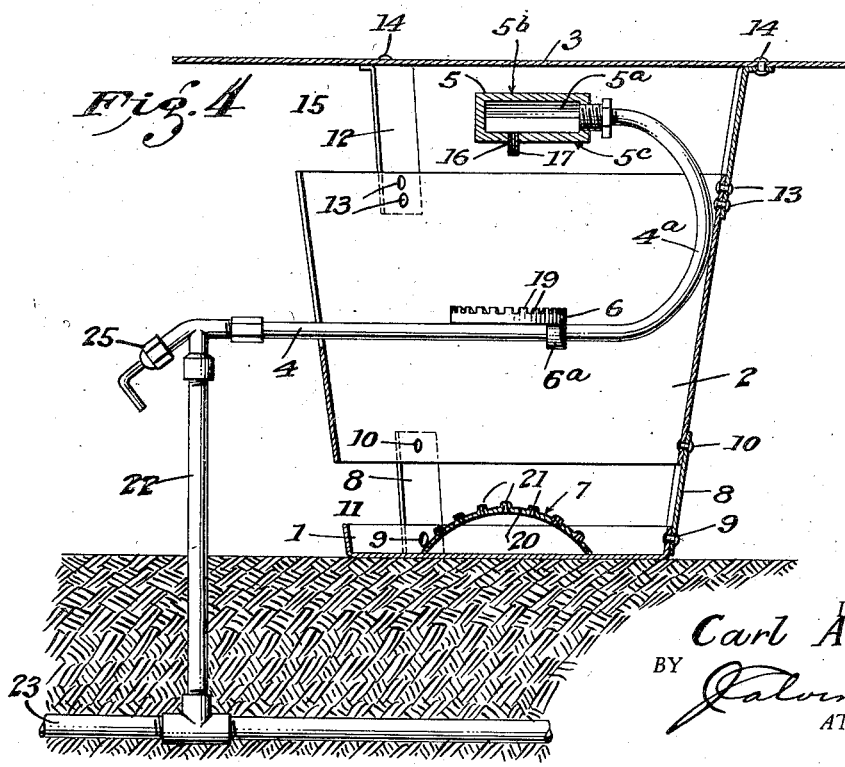

In the drawings:

Figure 1 is a plan view of my invention as applied to a citrus fruit tree orchard, Figure 2 is an elevation of an apparatus for supplying petroleum oil or distillate under pressure to the burners of the heaters shown in Figure 1, Figure 3 is a plan view, partly broken away to show certain features of my orchard heater, and, Figure 4 is a transverse vertical section of my orchard heater taken on line 4—4 of Figure 3.

Referring to the drawings, and particularly to Figures 3 and 4, wherein I have shown a certain embodiment of my improved heater, I is a pan of any convenient shape, and in the present instance shown as circular; 2 is a body in the present instance, inverted frusto-conical in form; and 3 is a plate, hereinafter termed the spreader plate. A fuel supply pipe 4 is adapted to be passed inwardly through a side wall slot in the body and curved so as to have an end portion lying beneath the spreader plate and substantially in that portion intermediate the lower surface of the spreader plate and the rim of the body. Secured to the pipe 4 is a nozzle 5. This nozzle is formed with a chambered portion 5a, with which the said pipe 4 communicates. The nozzle is provided with an orifice 16 adapted to receive an adjustable and removable burner tip 17. As shown in the figures, the top surface 5b of the burner may be curved, while the adjoining bottom wall 5c is substantially flat. It has been found that this construction is convenient for the purpose intended and for an efficient operation of the nozzle. It will be observed that the construction is such that the nozzle portion lies within the space included between the upper end of the body and the lower surface of the spreader plate, and in this connection, I maintain the spreader plate spaced at a desired distance above the body by means of legs 12, of which there may be a plurality. These legs are maintained in position to the body through the medium of suitable securing devices 13 and the spreader plate is held to said legs by angularly bending the legs and securing said angularly bent portions to the plate by means 14. It is to be observed that the pipe 4 extends radially inwardly of the body and then curved, as shown at 4a, in such a manner that the curve occurs adjacent the inner wall surface of the body 2.

Adapted to be secured to the pipe 4 substantially at the axis of the body is what is termed a hot plate 6. This plate is circular in form and provided with a downwardly extending lug 6a, so constructed as to readily facilitate fastening of the plate to the pipe 4 and to maintain the plate in position. This plate is maintained in a position substantially at right angles to the axis of the body. The plate, furthermore, is provided with an annular series of upstanding serrations or teeth 19, and adjacent the periphery of the plate. The outlet of the burner tip is substantially positioned along the axis of both the plate 6 and the body 2. The body 2 is held spaced above the pan I by means of legs 8, said legs being secured to the pan by any suitable means 9, and means 10 is likewise provided between the said legs and the body. This construction provides what may be termed a draft inlet portion between the top of the pan and the pan base portion of the body 2, as indicated at 11. The space included between the spreader plate and the top of the body, I have designated as 15. I have provided for the pan I a generator 7 constituting a plate 20, which is arcuate in form, and provided with a plurality of jets 21. This generator is adapted to have its ends resting upon the base of the pan 1 and to be positioned directly below the hot plate 6. The pipe 4 is secured to a valved connector, the valve of which is designated as 25, and which valved connector likewise directly communicates with a pipe 22 connected to an underground fuel supply pipe 23. This pipe 23 leads from a pressure supply apparatus 24.

The pressure fuel supply apparatus 24 comprises a storage tank 26 for the fuel, such as crude petroleum oil or distillate, and two pressure tanks 27 and 28. From said storage tank leads a supply pipe 29, controlled by a valve 30, and from said supply pipe lead two connecting pipes 31 and 32 into one end of the pressure tanks 27 and 28, respectively, which connecting pipes are respectively controlled by valves 33 and 34. From a water pressure main 35, a pipe 36 leads to a connecting pipe 37 which connects to vertical pipes 38 leading into the bottom of the pressure tanks 27 and 28, the pipe 36 being controlled by a valve 39, and there being an automatic pressure control device 40 interposed in the pipe 36 between the valve 39 and the connecting pipe 37. A connecting pipe 43 connects at its ends to the top of the pressure tanks 27 and 28 and between its ends to another connecting pipe 44 which in turn connects at 45 to the underground fuel supply pipes 23 in an orchard, as illustrated in Figure 1 of the drawings.

The operation, uses and advantages of my invention are as follows:

The tank 26 is adapted to hold a fuel oil which under gravity, directs the flow of oil into the tanks 27 and 28. Passage of fluid within said tanks is regulated through the medium of the valve 30 and the valves 33 and 34. Water under pressure is directed within said tanks for the purpose of creating a pressure upon the fuel oil within the said tanks, and which pressure may be readily indicated through the medium of any suitable form of pressure gage, such as illustrated for one of the tanks at 100.

Assuming a given pressure, the fuel oil may be directed through the various connecting pipes leading to the several heaters within an orchard. When it becomes necessary to light a heater, a frost warning having been given, it is ordinary practice for an operator to proceed through the orchard with a torch adapted to contain distillate or other fuel oil, and which torch is ignited. A torch of the character just referred to ordinarily is provided with a double spout, one spout being provided with a wick and the other spout being free, whereby when the wick is ignited and the lighter tipped, oil will flow through the other of said spouts and be ignited by the wick, and this burning oil is then deposited upon the hot plate 6 and any overflow will be received within the pan 1 and upon the generator plate 7. However, before pouring the burning oil upon the plate, it is customary to open the valve 25 so that oil will pass through the pipe 4 and into the chamber portion of the nozzle, and thence through the burner tip to drop upon the plate 6. The torch, by depositing burning oil, will likewise ignite whatever oil is passing through the burner pipe, with the result that the nozzle will be heated. Heating of the nozzle will cause generation of gas, and the greater the heat, the greater the gas under pressure projected downwardly toward the plate 6 by the tip. The plate 6 thereupon becomes hot and for this reason, I have termed the plate 6 a "hot" plate.

Merely directing the flame against the hot plate, however, is not sufficient to properly cause combustion of the gas. However, the presence of the serrations 19 on the hot plate allows the gas to receive a proper amount of oxygen to permit proper combustion. It has been found by experiment that air is drawn upwardly through the space 11 within the body 2, and thereupon contacts with the burning gas directed downwardly from the tip against the hot plate, resulting in complete combustion of the gas, and when the burner is in operation, the flame appears to be in the form of a plurality of fingers extending radially outwardly and upwardly from the hot plate and toward the spreader plate 3. The flame is substantially blue in appearance or may assume a white appearance, depending upon regulation of the valve 25. The entire portion of the body rapidly becomes filled with flame, although it has been found that the side wall of the body is substantially cool due to the presence of a cushion of air between the inner wall surface of the body and the flame. The flame is then directed upwardly adjacent the spreader plate and out through the space 15, and in this connection, the spreader plate has likewise been found to be substantially cool due to the presence of a cushion of air therebeneath. My heater derives much of its efficiency from the fact that cold air adjacent the ground is drawn inwardly through the space 11 and upwardly to support combustion, with the heated air then directed outwardly through the medium of the spreader plate. The combustion is found to be so complete as to burn all of the petroleum without the production of soot. Further, a single heater is found to be sufficient for at least four trees, as depicted in Figure 1.

Another phase of efficiency in the heater is due to the possibility of properly regulating the amount of fuel to air through the medium of the single valve 25. Ordinarily, when a frost alarm is given, the heaters must be ignited within an orchard in a given minimum time. For this purpose, the different valves 25 may be set in advance and left so set, the only requirement being that when a given frost alarm is circulated, the valves leading from the tanks 27 and 28 must be opened so that fluid under pressure will be directed to the heaters, whereupon one or more men with lighted torches can rapidly pass from heater to heater and ignite the same.

The oil received upon the generator plate 7 burns effectively and efficiently due to the fact that air may be received beneath the said plate and the flame will then project upwardly in the form of jets, the air passing through the jet openings 21. This is found to be more efficient than the provision of the pan alone without the generator plate. It is, of course, apparent that the valve may be opened at any time desired and after the heater has commenced proper generation, that the valve may be further regulated to give maximum efficiency.

A large measure of success of the present type of heater is due to the fact that the burner tips may be renewed if they become clogged with carbon. This obviates the necessity of reboring or the cleaning of a fixed opening.

A heater of the character described is inexpensive of manufacture, easily assembled, and the laying of pipes within an orchard is a simple matter as the pipes need only be laid at a sufficient distance within the earth to permit ready furrowing or plowing of the earth without interfering with the pipes. It is possible to accurately gage the amount of fuel required and it is also possible to shut off the heaters at any time desired by turning off the source of fuel supply to the burners. In this respect, suitable valves may be interposed within the various lines leading to the heaters so that any given number of heaters in a given area may remain burning without affecting the other heaters.

The spreader plate which is mounted a short distance above the upper end of the combustion chamber discharges the heat outwardly at a low altitude in a horizontal direction, which action is assisted by the inverted frusto-conical combustion chamber, whereby the heat from the heater is discharged over a greater area at a low altitude in the orchard than otherwise, allowing the heat to pass upwardly through the trees, whereby the trees are thoroughly and most effectively heated without smudging.

It is obvious that various changes and modifications and variations may be made in practicing the invention in departure from the particular showing of the drawing without departing from the true spirit of the invention.

I claim:

1. An orchard heater including a three-part casing, to-wit, an open ended body, a spreader plate spacedly held at one end of said body, and a pan spacedly held at the opposite end of said body, a fuel supply pipe passed diametrically through said body, a chambered nozzle included in the space between the plate and one end of the body, said fuel supply pipe communicating with the chamber of said nozzle, a plate formed with an annular series of carbureting slots, said nozzle being provided with an orifice tip extending exteriorly thereof and within the chamber, said orifice tip being directed toward the central portion of the said second plate, and a generator plate within the pan of the casing; the arrangement being such that, when fuel oil is ignited within the pan and on the generator plate, the heat of burning thereof will heat any fuel passed through the fuel line into the chamber of the nozzle, the plate provided with air inlets, and said nozzle, to in turn gasify said fuel and direct said gasified fuel through said orifice tip downwardly against said second plate, the air inlets of said second plate functioning to direct air passed through the space included between the pan and the body to form a burnable mixture with said gas, combustion of which is spread outwardly and downwardly relative to said body by the spreader plate.

2. A burner including an open-ended casing, a spreader plate spaced above the upper end of said casing, a hot plate positioned within said casing, a nozzle mounted above said hot plate and formed with a chamber and a burner outlet leading from said chamber to a point above said hot plate, means for conducting a gasifiable and burnable fluid to said nozzle chamber, means on said hot plate for dividing a gas flame directed thereupon from said burner outlet for mixing said divided flame with the air surrounding said hot plate, and a pan spaced below the lower end of said casing for receiving any overflow liquid fuel from said hot plate.

3. A burner as characterized by claim 2, including a generator plate mounted in said pan upon which overflow fuel from said hot plate is deposited for ignition.

4. A burner as characterized by claim 2, including an arcuate perforated burner plate having its ends resting within said pan, upon which plate overflow fuel from said hot plate is deposited for ignition.

5. A burner as characterized by claim 2, including an arcuate burner plate having its ends resting within said pan for receiving overflow fuel from said hot plate for ignition, said generator plate being formed with upwardly extending jets through which air may pass through the plate from the under side thereof to support combustion of fuel deposited on the upper side of said plate from said hot plate.

6. A burner including a casing, a spreader plate spaced above the upper end of said casing, a burner nozzle formed with a burner tip and positioned between the upper end of said casing and said spreader plate, a hot plate positioned within said casing below said burner tip and formed with outwardly disposed carbureting serrations for dividing a flame directed by said burner tip upon said plate, and mixing the divided flame with air surrounding said hot plate for supporting combustion within said casing.

CARL A. FUGIT.